(12) United States Patent
Moore et al.

(10) Patent No.: US 8,317,506 B2
(45) Date of Patent: Nov. 27, 2012

(54) LINEAR ACTUATOR ASSISTED KNOCKOUT MECHANISM FOR A FOOD PATTY FORMING MACHINE

(75) Inventors: Chris Moore, Homer Glen, IL (US); Paul Taylor, Munster, IN (US)

(73) Assignee: Formax, Inc., Mokena, IL (US)

( * ) Notice: Subject to any disclaimer, the term of this patent is extended or adjusted under 35 U.S.C. 154(b) by 198 days.

(21) Appl. No.: 12/693,206

(22) Filed: Jan. 25, 2010

(65) Prior Publication Data

US 2010/0209575 A1 Aug. 19, 2010

Related U.S. Application Data

(60) Provisional application No. 61/147,444, filed on Jan. 26, 2009.

(51) Int. Cl.
*A22C 7/00* (2006.01)

(52) U.S. Cl. ........ 425/236; 425/256; 425/261; 425/556; 426/513

(58) Field of Classification Search .................. 425/556, 425/572, 236, 256, 261; 426/513
See application file for complete search history.

(56) References Cited

U.S. PATENT DOCUMENTS

| | | | |
|---|---|---|---|
| 3,887,964 A | * | 6/1975 | Richards ........................ 425/556 |
| 4,516,291 A | | 5/1985 | Goldberger et al. |
| 4,768,260 A | | 9/1988 | Sandberg |
| 5,122,051 A | * | 6/1992 | Joyner ........................... 425/556 |

* cited by examiner

*Primary Examiner* — Joseph Del Sole
*Assistant Examiner* — Seyed Masoud Malekzadeh
(74) *Attorney, Agent, or Firm* — Erickson Law Group, PC (57) ABSTRACT

A knockout mechanism for a food patty forming machine with one or more knockout cups for ejecting formed food from a cavity of a reciprocating mold plate. A rocker arm moves the knockout cup between a raised position and a knockout position. A linear actuator applies force to the knockout cup to move the knockout cup from the raised position to the knockout position. A spring also applies force on the rocker arm to move the knockout cup.

24 Claims, 9 Drawing Sheets

LINEAR ACTUATOR ASSISTED KNOCKOUT MECHANISM FOR A FOOD PATTY FORMING MACHINE

This application claims the benefit of U.S. Provisional Application No. 61/147,444, and filed Jan. 26, 2009.

FIELD OF THE INVENTION

The present invention relates to food patty-forming machines. The invention particularly relates to an improved knockout mechanism.

BACKGROUND OF THE INVENTION

Food processors utilize high-speed molding machines, such as FORMAX® MAXUM700®, ULTRA26™, F-6™, F-12™, F-19™, F-26™, or F-400™ reciprocating mold plate forming machine, available from Formax, Inc. of Mokena, Ill., U.S.A., for supplying patties to the fast food industry. High-speed molding machines are also described for example in U.S. Pat. Nos. 3,887,964; 4,372,008; 4,356,595; 4,821,376; 4,996,743, and 7,255,554, as well as U.S. Patent Application No. 60/881,877, Ser. Nos. 12/018,722, 12/018,778, 12/018,780, and 12/018,781.

The FORMAX® F-26™ reciprocating mold plate forming machine has enjoyed widespread commercial success for over 35 years. A typical FORMAX® F-26™ molding machine can operate at 90 strokes per minute and produce about 32,400 patties per hour based on the standard width mold plate for the F-26™ which is about 27 inches wide and can include 6 mold cavities.

The FORMAX® F-26™ molding machine is generally described in U.S. Pat. Nos. 3,887,964; RE30,096, 4,356,595 and 4,996,743. The FORMAX® F-26™ includes a supply system for supplying a moldable food material, such as ground beef, fish, or the like, to the processing mechanisms of the machine. The supply system comprises a large food material storage hopper that opens into the intake of a food pump system. The food pump system includes at least two food pumps that continuously pump food, under pressure, into a manifold connected to a cyclically operable molding mechanism.

In the operation of a FORMAX® F-26™ patty-forming machine, a supply of ground meat or other moldable food material is dumped into the hopper from overhead. The floor of the hopper comprises a conveyor belt for moving the food material longitudinally of the hopper toward the other components of the food material supply system.

At the forward end of the hopper the food material is fed downwardly by the supply system into the intake of the reciprocating pumps constituting the pumping system. The pumps operate in overlapping alteration to each other; at any given time when the machine is in operation at least one of the pumps is forcing food material under pressure into the intake of the manifold.

The manifold comprises a valving system for feeding the food material, still under relatively high pressure, into the molding mechanism. The molding mechanism operates on a cyclic basis, first sliding a multi-cavity mold plate into a receiving position over the manifold and then away from the manifold to a discharge position aligned with a series of knockout cups. When the mold plate is at its discharge position, the knockout cups are driven downwardly, discharging the hamburger patties or other molded products from the machine.

The mold plate is connected to a pair of drive arms that extend alongside the housing and are each connected at one end to a swing link. The other end of each link is pivotally connected to one of a pair of rocker arms which, with a second arm, forms cranks pivoted on a fixed shaft. The free end of each crank arm is connected to a connecting rod assembly that includes a lost motion connection that provides some dwell time at the discharge or knockout position of mold plate, so that the knockout cups have time to enter and leave the mold cavities while mold plate is at rest. The connecting rod is connected to a mold plate crank arm having a crank pin linked to the output shaft of a gear reducer. The gear reducer is driven through a variable speed drive actuated by a mold plate drive motor. In the FORMAX Ultra26™, the gear reducer is driven by a servomotor.

The molding mechanism further comprises a knockout mechanism. The knockout mechanism comprises the knockout cups, which are affixed to a carrier bar that is removably mounted upon a knockout support member. The knockout cups are coordinated in number and size to the mold cavities in the mold plate; there is one knockout cup aligned with each mold cavity and the mold cavity size is somewhat greater than the size of an individual knockout cup.

A knockout support member is carried by two knockout rods. Each knockout rod is disposed in an individual housing and is pivotally connected to its own knockout rocker arm.

Each knockout rocker arm is pivotally mounted upon a shaft. Two springs are connected to each knockout rocker arm, biasing the arm toward movement in a clockwise direction. Clockwise movement of each rocker arm is limited by a stop aligned with a bumper mounted in a housing.

Each rocker arm is normally restrained against counterclockwise movement by engagement with a knockout cam; the two cams each have a notch aligned with the corresponding notch on the other cam. The cams are affixed to a knockout cam shaft. The shaft extends across the housing to a right angle drive connection leading to a vertical knockout cam drive shaft that has a driving connection to the mold plate drive gear reducer output shaft via a lower right angle drive. In the FORMAX Ultra26™, the shaft is driven by a servomotor.

Although the FORMAX® F-26™ patty-forming machine has achieved widespread acceptance in the industry, the present inventors have recognized the advantages of a linear actuator assisted knockout mechanism having increased knockout force.

SUMMARY OF THE INVENTION

The invention provides a knockout mechanism for a food patty forming machine, with one or more knockout cups, which may include one or more rows of knockout cups for ejecting formed food from a cavity of a reciprocating mold plate, a rocker arm for moving the knockout cup between a raised position and a knockout position; and a linear actuator for moving the knockout cup from the raised position to the knockout position.

In an aspect of the invention, the linear actuator applies force to the knockout cup to move the knockout cup from the raised position to the knockout position. One aspect of the mechanism has a spring for applying force on the rocker arm.

In another aspect of the invention, the rocker arm is operatively connected to a cam having a notch. The linear actuator applies force to the knockout cup when the rocker arm reaches the notch.

In another aspect of the invention, the rocker arm has a pivot point about which the rocker arm pivots to move the knockout cup between the raised and the knockout positions.

In another aspect of the invention a knockout rod connects the knockout cup to the rocker arm.

In another aspect of the invention, a cap is disposed between the linear actuator and the knockout cup for transmitting force applied by the linear actuator to the knockout cup.

In another aspect of the invention, the linear actuator has a hydraulic or pneumatic device connected to a high pressure circuit and a low pressure circuit, and wherein the high pressure circuit is active when moving the knockout cups between the raised position and the knockout position, and wherein the low pressure circuit is active when the high pressure circuit is not active during a knockout cycle.

In another aspect of the invention, a knockout rod is operatively connected to the rocker arm and to the knockout cup. The linear actuator is positioned at an end of the knockout rod opposite the knockout cup. A cap is disposed between the linear actuator and knockout rod for transmitting force applied by the linear actuator to the knockout cup.

Numerous other advantages and features of the present invention will become readily apparent from the following detailed description of the invention and the embodiments thereof, from the claims, and from the accompanying drawings.

DETAILED DESCRIPTION

While this invention is susceptible of embodiment in many different forms, there are shown in the drawings and will be described herein in detail specific embodiments thereof with the understanding that the present disclosure is to be considered as an exemplification of the principles of the invention and is not intended to limit the invention to the specific embodiments illustrated.

Machine Overview

Figure 1:
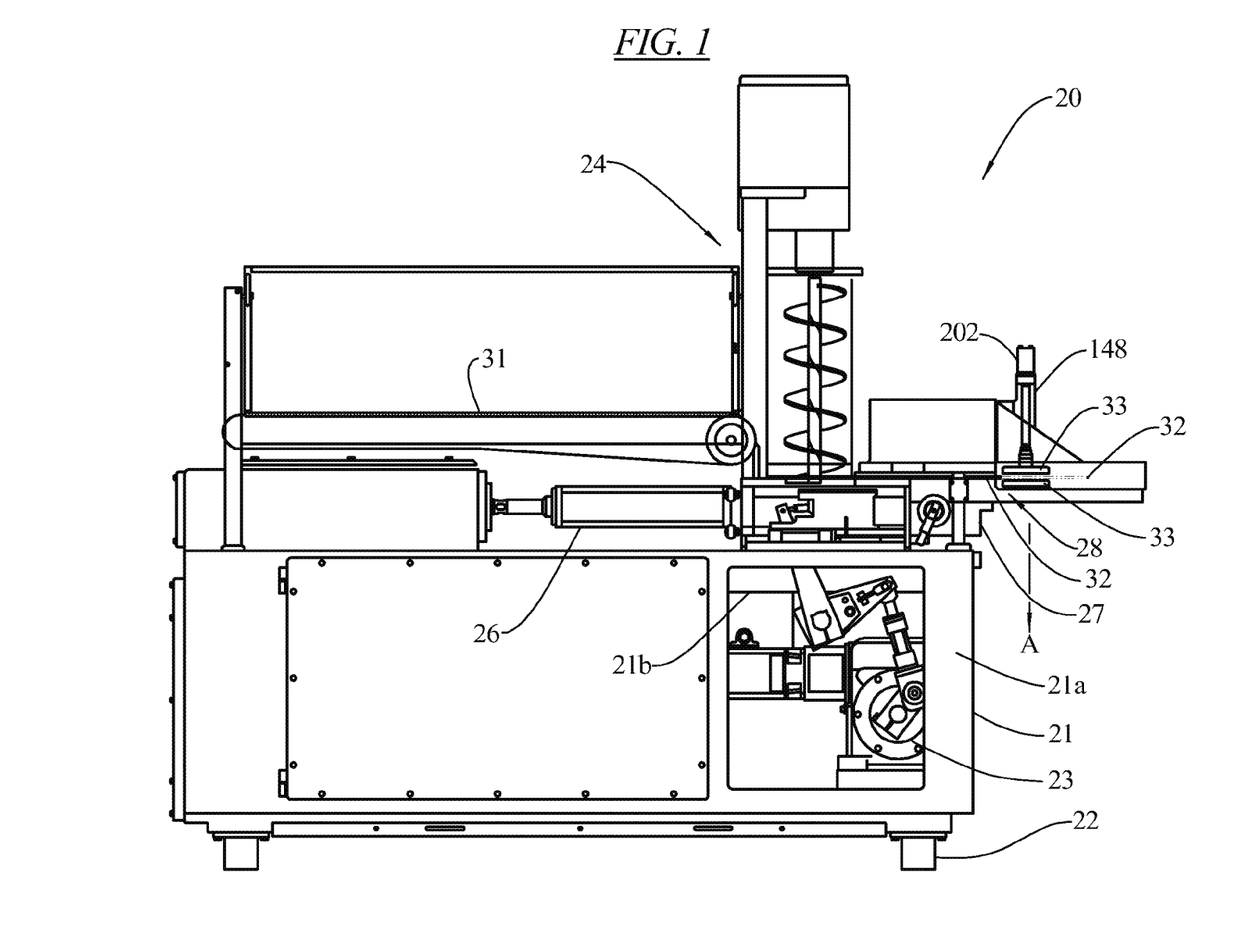
FIG. 1 is a right side elevation view of a high speed food patty molding machine constructed in accordance with an embodiment of the present invention, with some panels and components shown transparent to illustrate underlying components.

FIG. 1 illustrates a food patty-forming machine 20, such as the type described in U.S. Pat. Nos. 3,887,964 (RE 30,096), 4,356,595, 4,996,743, 4,329,828, 6,416,314, 6,749,421, and 7,255,554, and U.S. patent application Ser. No. 12/018,722, each herein incorporated by reference. The patty forming machine 20 may be such as those commercialized by FORMAX Inc. of Mokena, Ill., including the F-26™, ULTRA26™, and Maxum700® patty forming machines. The machine 20 includes a mold plate 32 driven to reciprocate in a horizontal plane by a drive 23.

As shown in FIG. 1, molding machine 20 includes a machine base 21, preferably mounted upon a plurality of rollers, wheels, or legs 22. Machine base 21 comprises an external skin 21a and an internal frame 21b and supports the operating mechanism for machine 20. The base 21 comprises a mechanical compartment that contains hydraulic actuating systems, electrical actuating systems, and most of the machine controls.

Molding machine 20 includes a supply system 24 for supplying a moldable food material, such as ground beef, fish, or the like, to the processing mechanisms of the machine. The supply system 24 comprises a large food material storage hopper 25 that opens into the intake of a food pump system 26. The food pump system 26 includes at least two food pumps that continuously pump food, under pressure, into a manifold 27 connected to a cyclically operable molding mechanism 28. Molding mechanism 28 is provided with an elevator system for use in changing the molding mechanism from one product to another.

In the operation of machine 20, a supply of ground meat or other moldable food material is dumped into hopper 25 from overhead. The floor of hopper 25 comprises a conveyor belt 31 for moving the food material longitudinally of the hopper toward the other components of the food material supply system 24.

At the forward end of hopper 25, the right hand end of the hopper as seen in FIG. 1, the food material is fed downwardly by the supply system 24 into the intake of the reciprocating pumps constituting pumping system 26. The pumps of system 26 operate in overlapping alteration to each other; at any given time when machine 20 is in operation at least one of the pumps is forcing food material under pressure into the intake of manifold 27.

The manifold 27 comprises a valving system for feeding the food material, still under relatively high pressure, into the molding mechanism 28. Molding mechanism 28 operates on a cyclic basis, first sliding a multi-cavity mold plate 32 into a receiving position over manifold 27 and then away from the manifold to a discharge position aligned with a series of knockout cups 33. When mold plate 32 is at its discharge position, knockout cups 33 are driven downwardly, discharging the hamburgers or other molded products from machine 20, as indicated by arrow A in FIG. 1.

Knockout Mechanism

Molding mechanism 28 further comprises a knockout mechanism shown in FIGS. 2-7A. The knockout mechanism comprises the knockout cups 33, which are affixed to a carrier bar 145 that is removably mounted upon a knockout support member 146. Knockout cups 33 are coordinated in number and size to the mold cavities 126 in mold plate 32; there is one knockout cup 33 aligned with each mold cavity 126 and the mold cavity size is somewhat greater than the size of an individual knockout cup.

Knockout support member 146 is carried by two knockout rods 147. Each knockout rod 147 is disposed in an individual housing 148 and is pivotally connected to its own knockout rocker arm 149.

Figures 2, 3:
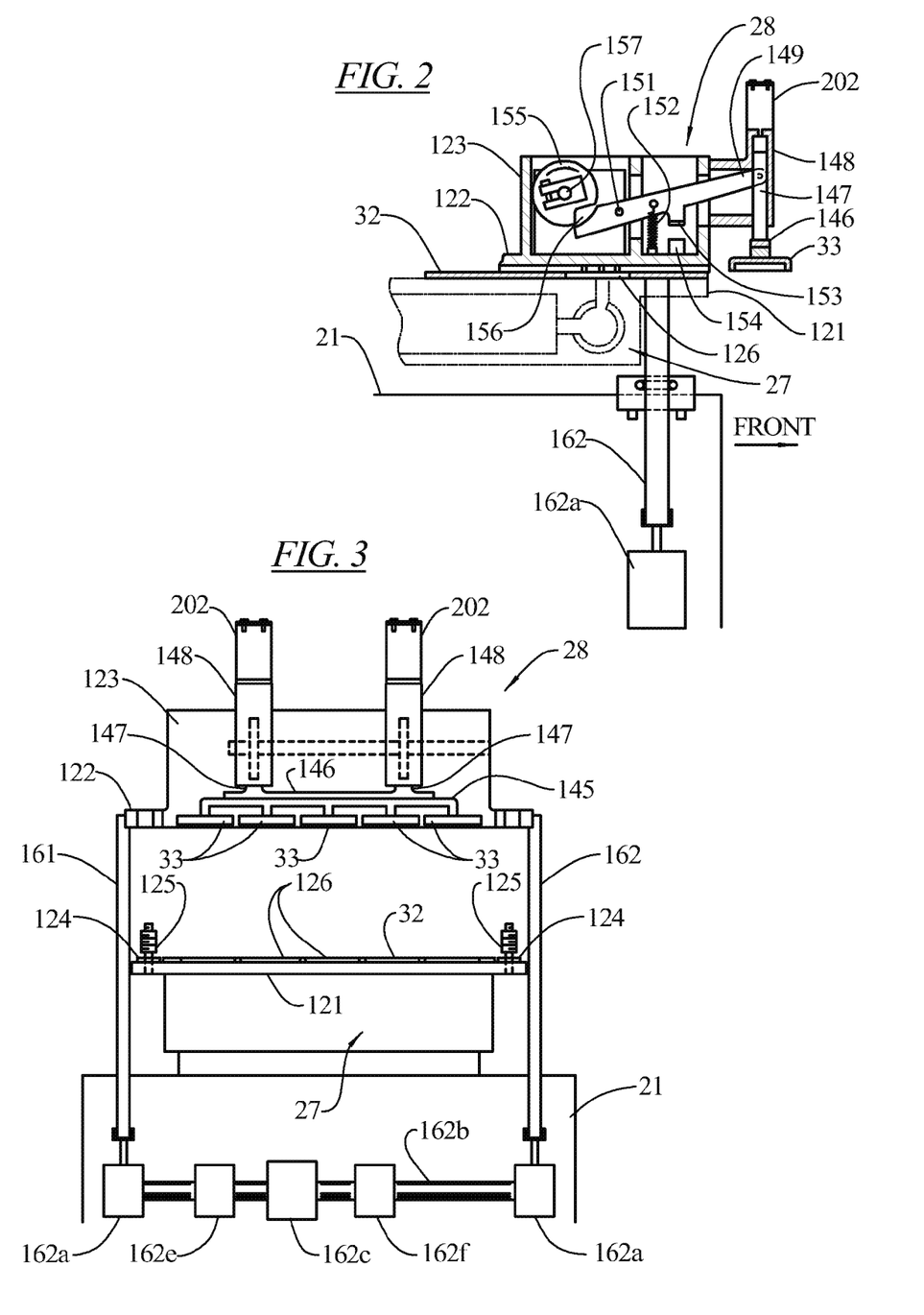
FIG. 2 is a fragmentary sectional view of the knockout drive and a part of the mounting apparatus for the molding mechanism of the patty molding machine.
FIG. 3 is a diagrammatic view, partly in cross section, of a part of the molding mechanism in a position utilized during change of a mold plate.
Figure 4:
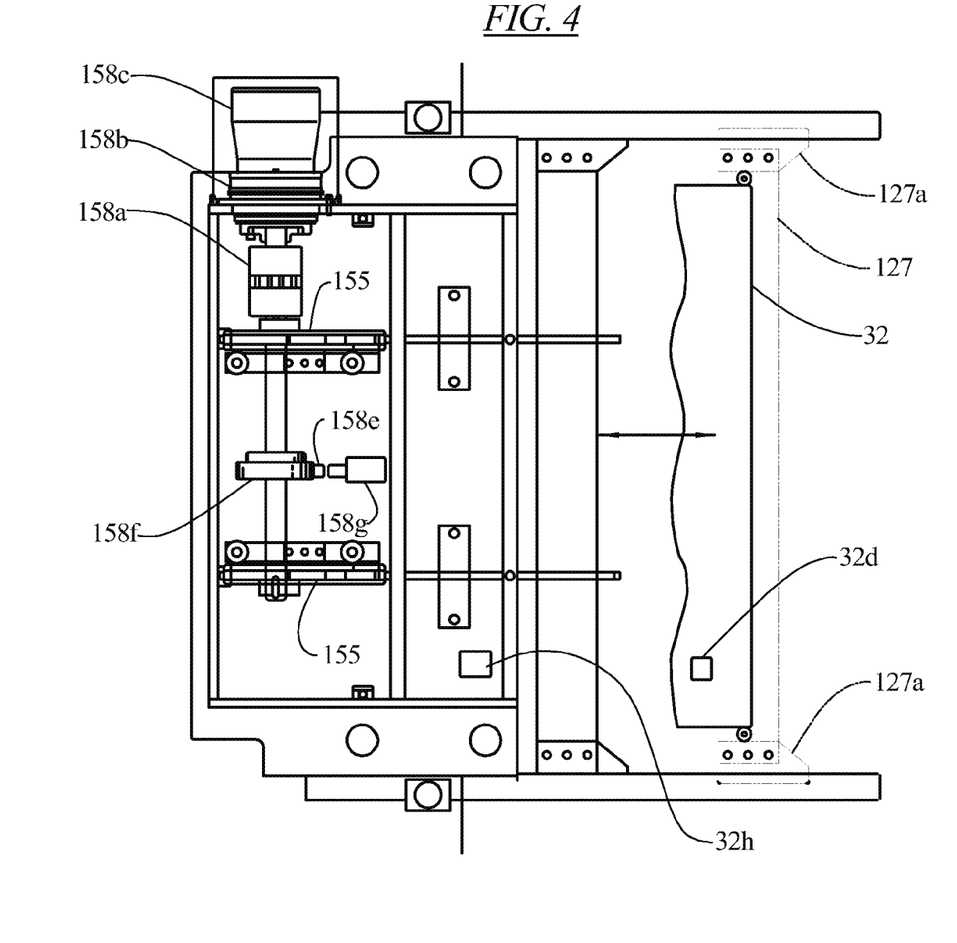
FIG. 4 is a fragmentary plan view, partly in cross section, of the molding mechanism.

Each knockout rocker arm is pivotally mounted upon a shaft 151. There, a pair of springs 152 are connected to each knockout rocker arm 149, biasing the arm toward movement in a clockwise direction as seen in FIG. 2. Clockwise movement of each rocker arm 149 is limited by a stop 153 aligned with a bumper 154 mounted in housing 123.

Each rocker arm 149 is normally restrained against counterclockwise movement by engagement with a knockout cam 155; the two cams 155 each have a notch 156 aligned with the corresponding notch on the other cam. Cams 155 are affixed to a knockout cam shaft 157.

Figure 5:
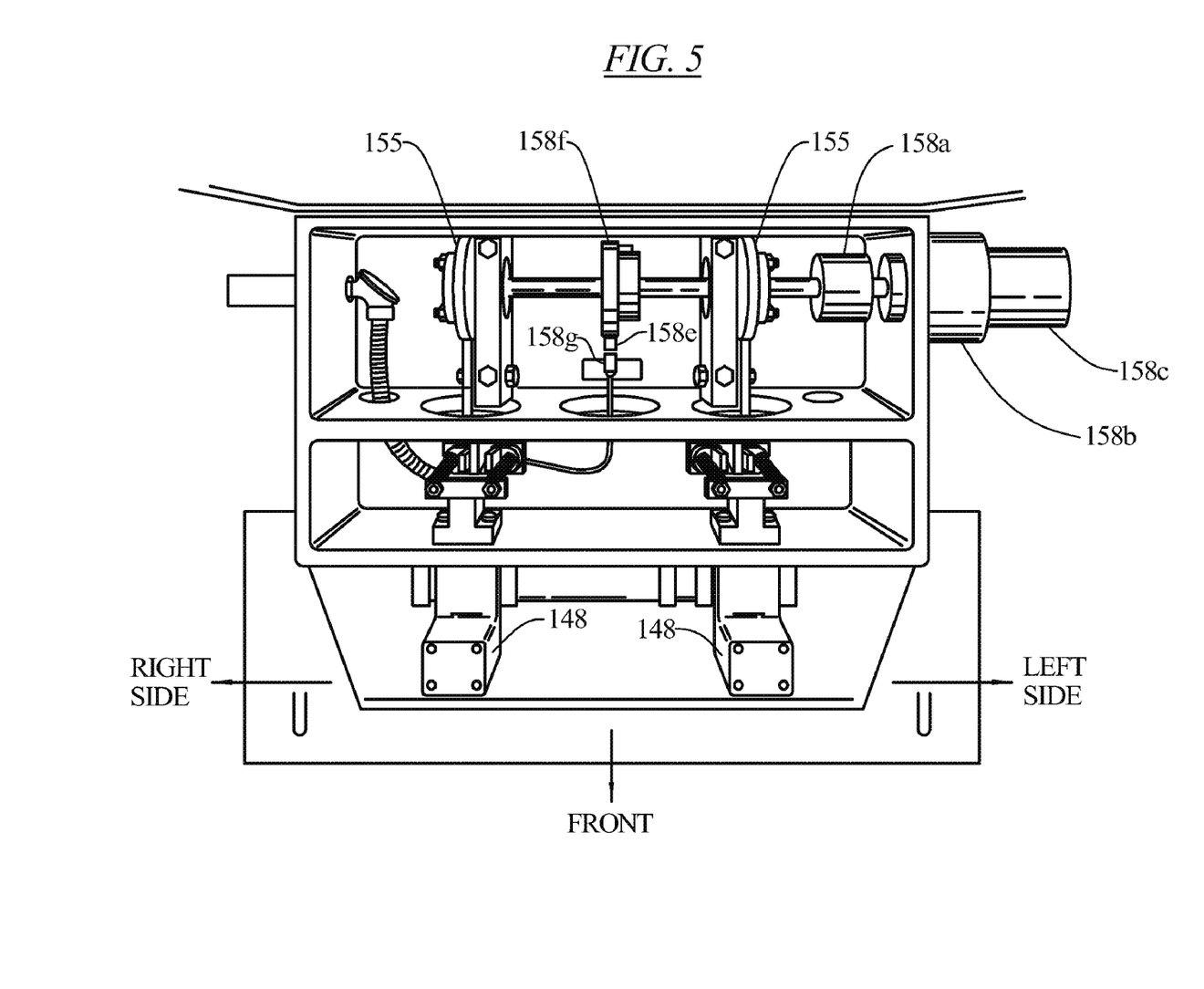
FIG. 5 is a fragmentary plan view of the knockout mechanism of the invention without a linear actuator shown.
Figure 6:
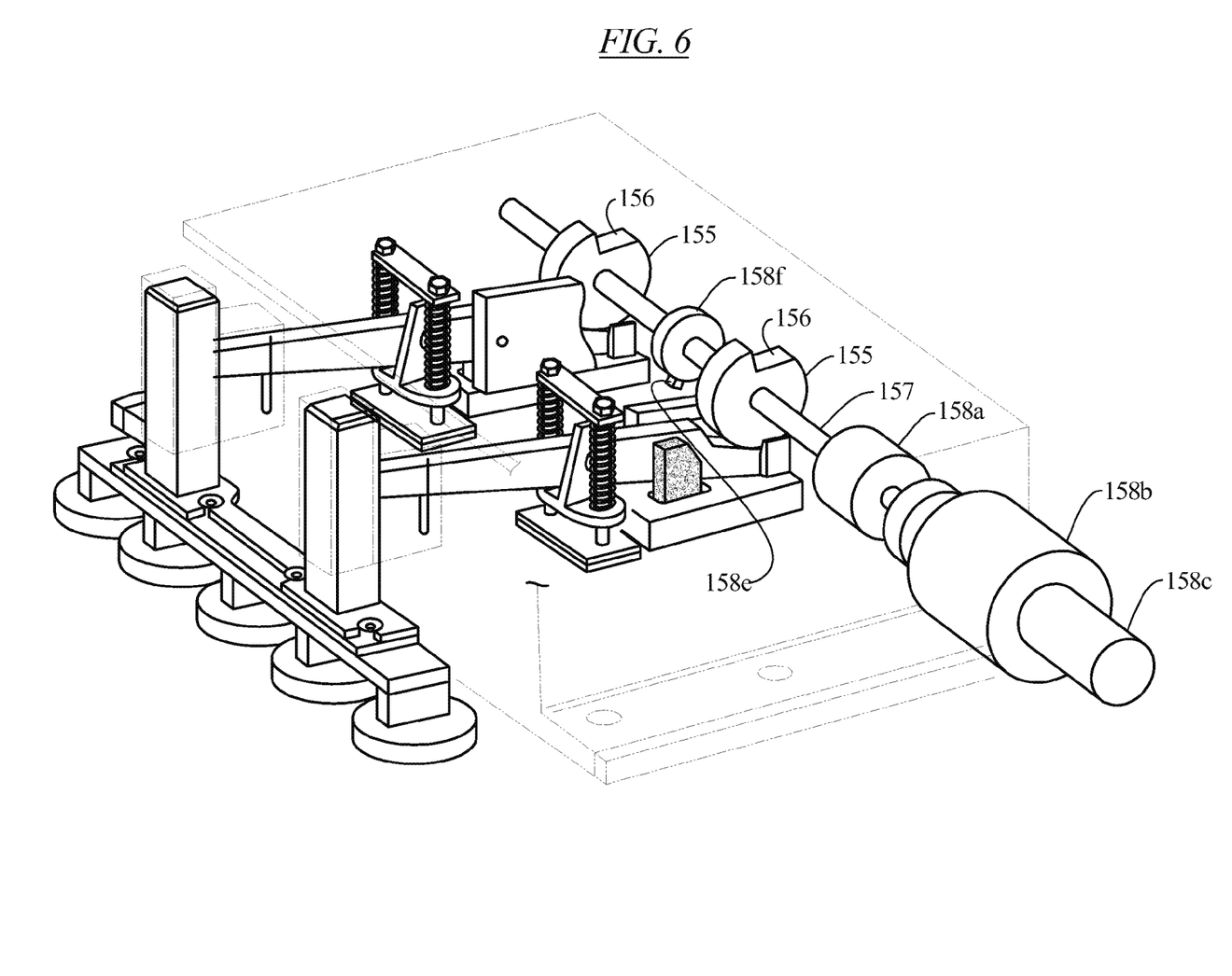
FIG. 6 is a perspective view of the knockout mechanism of the invention without the linear actuator shown.

A drive to drive the knockout mechanism is shown in FIG. 5. The knockout cam shaft 157 may be connected to the mold plate drive mechanism via a geartrain, as in the U.S. Pat. No. RE30,096, or via a coupling 158*a* to a gear reducer 158*b* that is connected to a motor 158*c* as shown in FIG. 5 and in U.S. patent application Ser. No. 12/018,722. In one embodiment, the motor 158*c* may be a servomotor. A position target 158*e* is provided mounted to a disk 158*f*, fixed to the shaft, to register an initial or home position to a sensor 158*g* connected to a machine control 920.

As shown in FIGS. 2, and 3, two cover lift rods 161 and 162 are affixed to cover plate 122 on opposite sides of the machine and extend downwardly into machine base 21. The lower end of each lift rod 162 is supported by a right angle gear elevator 162*a* that is driven by an axle 162*b* that is driven by a hydraulic motor 162*c* via couplings 162*e*, 162*f*. The operation of the lift rod arrangement is known in the current FORMAX® F-26™ patty-forming machine and is only described schematically. During a molding operation, the molding mechanism 28 is assembled as shown in FIG. 2, with cover plate 122 tightly clamped onto spacers.

A housing 123 is mounted upon cover plate 122. The spacing between cover plate 122 and support plate 121 is maintained equal to the thickness of mold plate 32 by support spacers 124 mounted upon support plate 121; cover plate 122 rests upon spacers 124 when the molding mechanism is assembled for operation, as shown in FIG. 3. Cover plate 122 is held in place by four mounting bolts 125.

Figure 7:
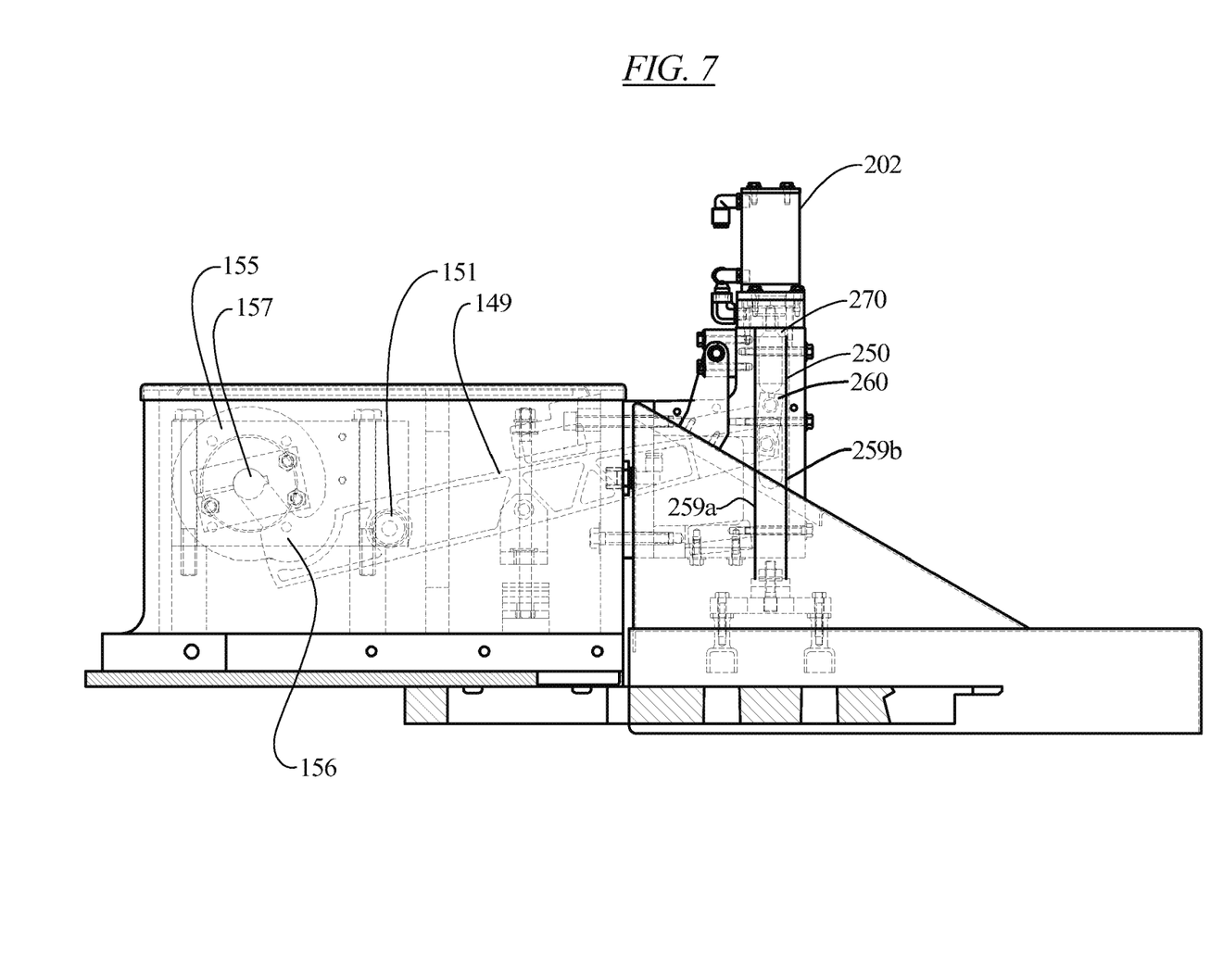
FIG. 7 is a fragmentary sectional view of the knockout mechanism of the patty molding machine with the linear actuator shown.
Figure 7A:
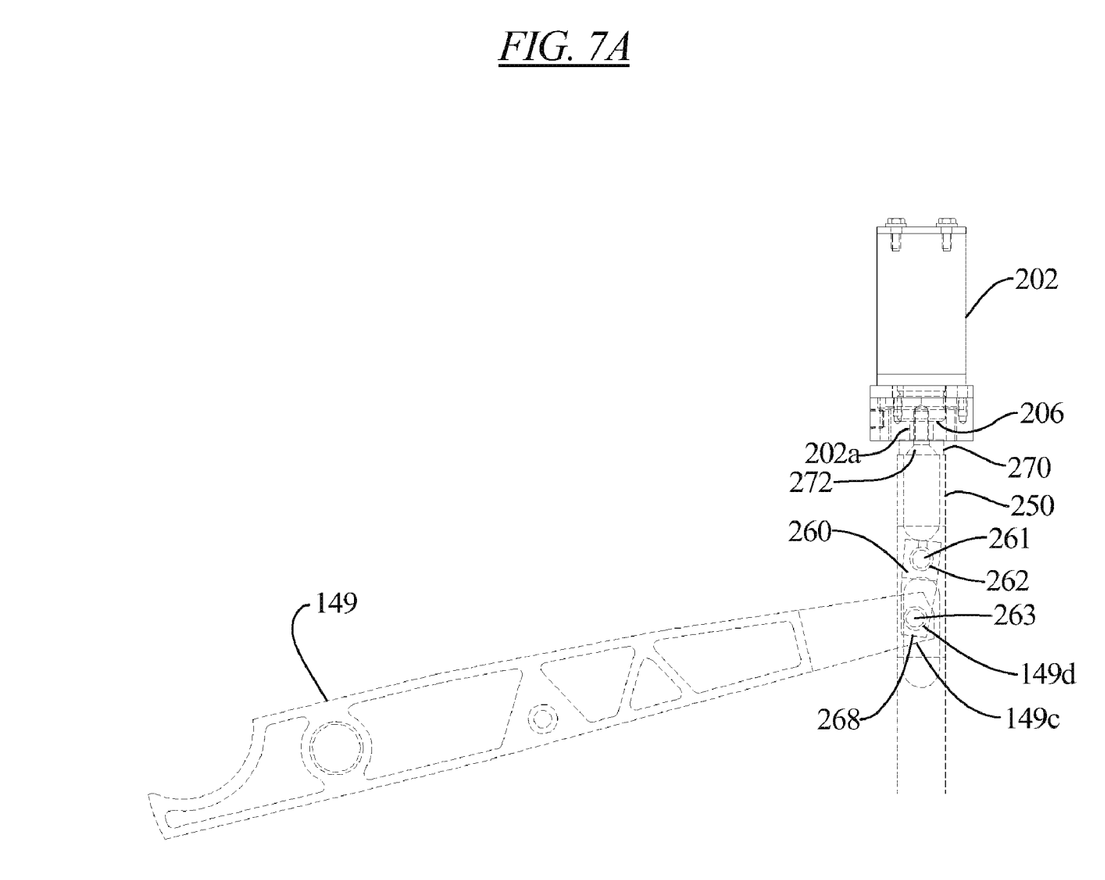
FIG. 7A is a fragmentary sectional view of the knockout mechanism of the patty molding machine with certain components removed for clarity.

FIGS. 7 and 7A show a detailed view of the knockout mechanism from FIG. 2. A linear actuator 202, such as a hydraulic cylinder, pneumatic cylinder, or other linear actuator such as an electric driven linear actuator, is mounted above the knockout rod 147. The knockout rod 147 comprises a slide bar 250. The slide bar 250 fits closely within the knockout housing 148 which guides vertical movement of the slide bar 250.

Figure 8A:
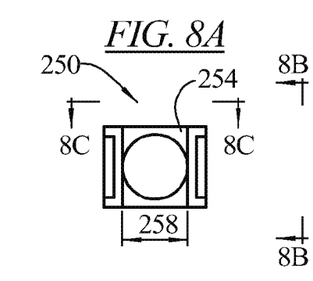
FIG. 8A is a bottom view of a slide bar.
Figure 8B:
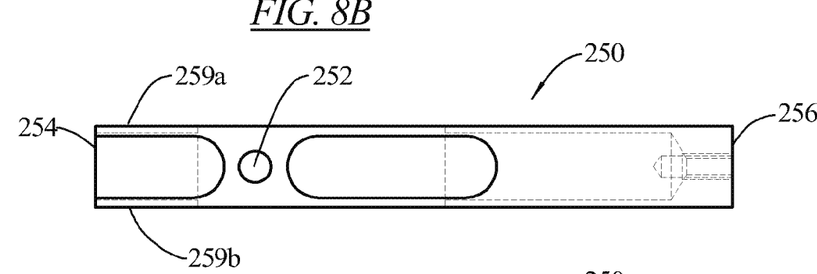
FIG. 8B is a side view of the slide bar taken from FIG. 8A.
Figure 8C:
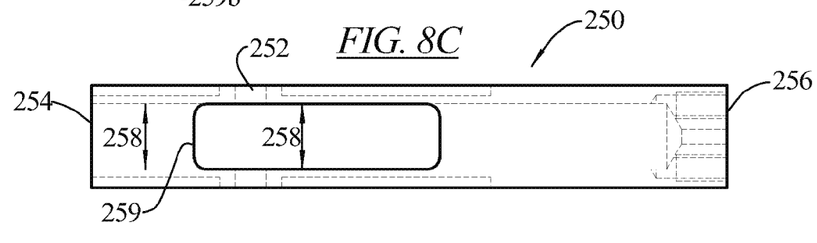
FIG. 8C is second side view of the slide bar taken from FIG. 8A.
Figure 8D:
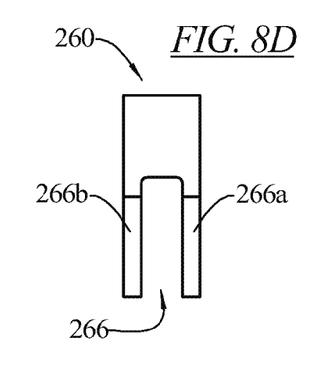
FIG. 8D is a side view of a swing link.
Figure 8E:
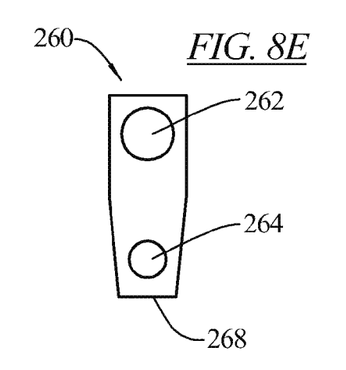
FIG. 8E is a second side view of the swing link.

A cap 270 is connected to an actuator rod 202*a* of the linear actuator 202 by a screw 272. The cap engages the top end 254 of the slide bar 250. In the illustrated embodiment, the cap abuts the top end 254 of the slide bar 250 without a mechanical fixation. The slide bar 250, as shown in FIGS. 8A, 8B, and 8C, has a link hole 252 and a hollow space 258. A swing link 260, as shown in FIGS. 8D and 8E, connects to the slide bar 250 at the link hole 252. The swing link 260 has a slide bar hole 262, an arm hole 264, and a cutout portion 266. The slide bar 250 has a bottom end 256 for operatively connecting to the knockout cups 33 via the knockout support plate 146.

The swing link 260 fits in the hollow space 258 of the slide bar 250. A pin 261 connects through the slide bar hole 262 and the link hole 252 to hold the swing link 260 in the hollow space 258. The swing link 260 is pivotable about the pin 261 within the hollow space 258. The swing link 260 pivots between a left position, as shown in FIGS. 7 and 7A, when the rocker arm 149 is in a raised position, and a right position (not shown), when the rocker arm 149 is in a pivoted-down position. The bottom end 268 of the swing link is closer to a second side 259*b* (FIGS. 7A, 8B) of the slide bar 250 when in the left position. The bottom end 268 is closer to a first side 259*a* (FIGS. 7A, 8B) of the slide bar 250 when in the right position.

A second pin 263 connects a first end 149*c* of the rocker arm to the swing link 260. The second pin 263 is positioned through a second link hole 149*d* of the rocker arm 149 and the arm hole 264 of the swing link 260. The rocker arm 149 fits in the cutout portion 266 of the swing link 260 between a first arm 266*a* and a second arm 266*b* of the swing link 260. The rocker arm 149 extends through a cutout portion 259 of the slide bar 250 to connect to the swing link 260.

Knockout Mechanism Operation

In each cycle of operation, the knockout cups have a raised position and a lowered position. The knockout cups 33 are first withdrawn upward, cams 155 pivoting knockout rocker arms 149 to their elevated positions to lift the knockout cups. The mold plate drive then slides the mold plate from the full extended position to the mold filling position, with the mold cavities 126 aligned with passageway 111.

The lost motion connections in the drive linkage assure some dwell time at the discharge or knockout position of mold plate 32, so that the knockout cups 33 have time to enter and leave the mold cavities 126 while mold plate 32 is at rest. Some dwell at the cavity filling position may also be provided. These knockout and fill dwells can also be accomplished by programming of the motion profiles of the mold plate drive motor (not shown) or the knockout mechanism drive motor 158*c*, each of which may be servomotors and such as those described in U.S. Pat. No. 7,255,554, herein incorporated by reference.

During most of each cycle of operation of mold plate 32, the knockout mechanism remains in the elevated position, with knockout cups 33 clear of mold plate 32. When mold plate 32 reaches its lowered and discharge position, however, the notches 156 in the cams 155 are brought into alignment with the knockout rocker arms 149. Synchronism is maintained between cams 155, the linear actuators 202, and mold plate 32 by the machine control 920.

When the rocker arms 149 reach the notches 156 in the cams 155, the two knockout rocker arms 149 are pulled rapidly downwardly by the springs 152 and the linear actuators 202, pivoting the two rocker arms in a clockwise direction. This movement of the rocker arms drives the knockout rods 147 downwardly, moving the knockout cups 33 through the mold cavities 126 to discharge molded food patties, from the mold plate 32. The discharged patties may be picked up by a conveyor 172 or may be accumulated in a stacker. If desired, the discharged patties may be interleaved with paper, by an appropriate paper interleaving device such as described in detail in U.S. Pat. No. 7,159,372, herein incorporated by reference or as heretofore known for the FORMAX® F-26™ patty-forming machine. In fact, machine 20 may be used with a wide variety of secondary equipment, including steak folders, bird rollers, and other such equipment.

Figure 9:
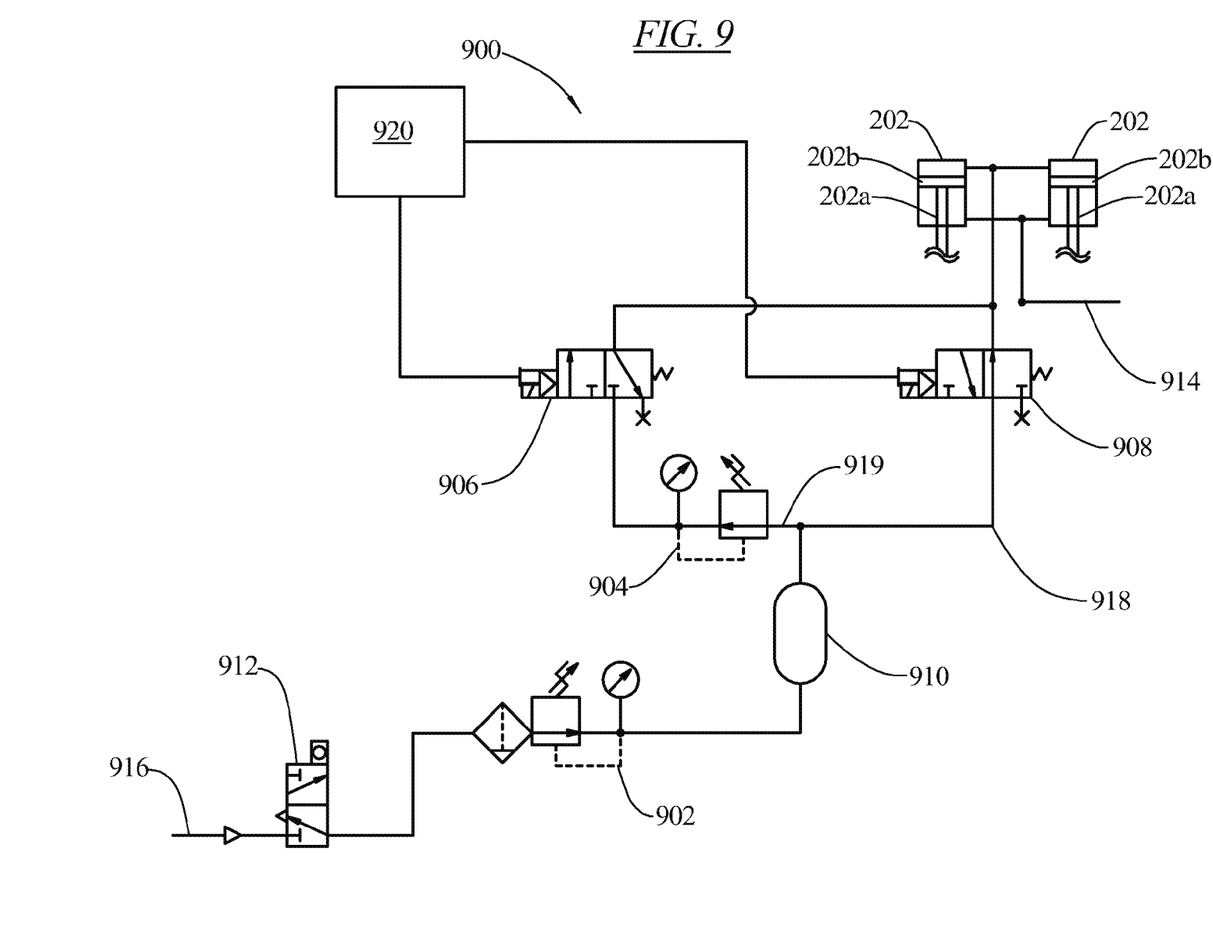
FIG. 9 is a schematical view of one embodiment of the pressure system 900.

When the rocker arms 149 reach the notches 156 in the cams 155, the machine control 920 commands force from the linear actuators to assist the springs in driving the knockout cups 33 through the mold plate 32. FIG. 9 shows a schematical view of one embodiment of the pressure system 900. Air pressure or hydraulic pressure is supplied on line 916 to a lockout valve 912. The lockout valve 912 is for stopping or allowing pressurized fluid, such as pressurized air, to the pressure system 900. The lock out valve 912 may be manually operated or may be controlled by the machine control 920.

A first regulator 902 ensures the line pressure downstream of the first regulator 902 does not exceed a first predefined amount. In one embodiment, the first regulator limits downstream pressure to the first predefined value within the range of 60 to 80 psi (4.22 Kilograms/cm$^2$ to 5.6248 Kilograms/cm$^2$). An accumulator 910 is shown and provides a pressure reserve to accommodate changes in pressure demand during the cycle. A first circuit valve 908, when open as controlled by the machine control 920, allows the first predefined line pressure set by the first regulator 902 to be applied to top cavities above pistons 202b of the linear actuators 202. A second regulator 904 is placed on line 919 ahead of a second circuit valve 906. The second regulator 904 ensures the line pressure downstream of the second regulator 904 does not exceed a second predefined amount. The second predefined amount of the second regulator 904 is less than the first predefined amount of the first regulator 902. In one embodiment, the second regulator limits downstream pressure to a predefined value of 5 psi (0.0352 Kilograms/cm$^2$). The second circuit valve 906, when open as controlled by the machine control 920, allows the second predefined line pressure set by the second regulator 904 to be applied to top cavities above pistons 202b of the linear actuators 202. Pressure within the cavities above the pistons 202b tend to drive the pistons 202b and actuator rods 202a downward. Exhaust line 914 exhausts pressure from bottom cavities below pistons 202b during downward movement of the pistons 2021) of the linear actuators 202.

The machine control 920 determines when the first valve 908 is open, and the machine control 920 also determines when the second valve 906 is open. The machine control regulates the amount of pressure applied to the linear actuators 202 by opening one of the first valve 908 or the second valve 906. FIG. 9 shows valve 908 open and valve 906 closed.

The machine control 920 opens valve 208 and closes valve 906 and the system 900 applies between 60 to 80 psi to the linear actuators 202 (4.22 Kilograms/cm$^2$ to 5.6248 Kilograms/cm$^2$) to exert force on the cap 270 and the slide bar 250 of the knockout rods 147, when the rocker arm 149 reaches the cam notch 156. This forces the slide bar between the raised position and lowered position to displace the knockout cups 33 to a fully lowered position.

When the cams 155 are at a position to lift the rocker arms 149, air pressure is released from the linear actuators to allow the knockout rods 147 to rise. Preferably, the linear actuators 202 may maintain a small amount of force against the slide bar 250 to ensure the cap 270 maintains contact with the top end 254 of the slide bar 250 at all times, while allowing the knockout rods 147 to rise in sync with the cams 155. In this regard, the control 920 closes the valve 908 and opens the valve 906 and a small amount of maintenance pressure is delivered by the system 900 to the linear actuators, such as 5 psi (0.0352 Kilograms/cm$^2$) set by the regulator 904.

From the foregoing, it will be observed that numerous variations and modifications may be effected without departing from the spirit and scope of the invention. It is to be understood that no limitation with respect to the specific apparatus illustrated herein is intended or should be inferred. It is intended to cover by the appended claims all such modifications as fall within the scope of the claims.

The invention claimed is:

1. A knockout mechanism for a food patty forming machine, comprising:
   a knockout cup having a raised position and a lowered position,
   a rocker arm arranged to pivot and operatively connected to the knockout cup to move the knockout cup between the raised position and the knockout position to eject formed food from a cavity of a reciprocating mold plate; and
   a linear actuator operatively connected to the knockout cup for moving the knockout cup from the raised position to the knockout position,
   wherein the linear actuator comprises a hydraulic or pneumatic device connected to a high pressure circuit and a low pressure circuit, and wherein the high pressure circuit is active when moving the knockout cups between the raised position and the knockout position, and wherein the low pressure circuit is active when the high pressure circuit is not active during a knockout cycle.

2. The knockout mechanism of claim 1, wherein the linear actuator comprises a hydraulic or pneumatic cylinder which receives a pressurized fluid to move the knockout cup from the raised position to the knockout position.

3. The knockout mechanism of claim 1, comprising a spring for applying force on the rocker arm.

4. The knockout mechanism of claim 1, comprising a cam having a notch, the rocker arm operatively connected to the cam such that the rocker arm follows the outside perimeter of the cam as the cam is rotated, and wherein the linear actuator applies force to the knockout cup when the rocker arm reaches the notch.

5. The knockout mechanism of claim 1, wherein the rocker arm comprises a pivot point about which the rocker arm pivots to move the knockout cup between the raised position and the knockout position.

6. The knockout mechanism of claim 1, comprising a knockout rod connecting the knockout cup to the rocker arm.

7. The knockout mechanism of claim 1, comprising a cap disposed between the linear actuator and the knockout cup for transmitting force applied by the linear actuator to the knockout cup.

8. The knockout mechanism of claim 1, comprising a knockout rod operatively connecting the rocker arm to the knockout cup, the linear actuator is positioned at an end of the knockout rod opposite the knockout cup, and a cap disposed between the linear actuator and the knockout rod for transmitting force applied by the linear actuator to the knockout cup.

9. A knockout mechanism for a food patty forming machine, comprising:
   a knockout cup having a raised position and a lowered position,
   a rocker arm arranged to pivot and operatively connected to the knockout cup to move the knockout cup between the raised position and the knockout position to eject formed food from a cavity of a reciprocating mold plate;
   a linear actuator operatively connected to the knockout cup for moving the knockout cup from the raised position to the knockout position; and
   a knockout rod operatively connecting the rocker arm to the knockout cup, the linear actuator is positioned at an end of the knockout rod opposite the knockout cup, and a cap disposed between the linear actuator and the knockout rod for transmitting force applied by the linear actuator to the knockout cup.

10. A food product forming machine, comprising:
    a machine frame,
    a mold plate having at least one cavity and mounted to reciprocate in a longitudinal direction with respect to said frame to position the cavity between a all position and a patty knock out position;

a food product delivery channel mounted stationary with respect to the frame and having a fill opening into the cavity when the mold plate is in the fill position;

a knockout cup for ejecting formed food from the mold plate;

a rocker arm configured to move the knockout cup between a raised position and a knockout position;

a linear actuator configured to move the knockout cup from the raised position to the knockout position, and wherein the linear actuator comprises a hydraulic device connected to a high pressure circuit and a low pressure circuit, and wherein the high pressure circuit is active when moving the knockout cups from the raised position to the knockout position, and wherein the low pressure circuit is active when the high pressure circuit is not active during a knockout cycle.

11. The forming machine of claim 10, wherein the linear actuator applies force to the knockout cup to move the knockout cup from the raised position to the knockout position.

12. The forming machine of claim 10, comprising a cam having a notch, the rocker arm operatively connected to the earn such that the rocker arm follows the outside perimeter of the cam as the cam is rotated, and wherein the linear actuator applies force to the knockout cup when the rocker arm reaches the notch.

13. The forming machine of claim 10, wherein the rocker arm comprises a pivot point about which the rocker arm pivots to move the knockout cup between the raised and the knockout positions.

14. The forming machine of claim 10, comprising a cap disposed between the linear actuator and the knockout cup for transmitting force applied by the linear actuator to the knockout cup.

15. The forming machine of claim 10, comprising a knockout rod operatively connecting the rocker arm to the knockout cup the linear actuator is positioned at an end of the knockout rod opposite the knockout cup, and a cap is disposed between the linear actuator and knockout rod to transmit force applied by the linear actuator to the knockout cup.

16. A food product forming machine, comprising:
a machine frame,
a mold plate having at least one cavity and mounted to reciprocate in a longitudinal direction with respect to said frame to position the cavity between a fill position and a natty knock out position;
a food product delivery channel mounted stationary with respect to the frame and having a fill opening into the cavity when the mold plate is in the fill position;
a knockout cup for ejecting formed food from the mold plate;
a rocker arm configured to move the knockout cup between a raised position and a knockout position;
a linear actuator configured to move the knockout cup from the raised position to the knockout position; and
a knockout rod operatively connecting the rocker arm to the knockout cup, the linear actuator is positioned at an end of the knockout rod opposite the knockout cup, and a cap is disposed between the linear actuator and knockout rod to transmit force applied by the linear actuator to the knockout cup.

17. The forming machine of claim 16, comprising a cam having a notch, the rocker arm operatively connected to the cam such that the rocker arm follows the outside perimeter of the cam as the cam is rotated, and wherein the linear actuator applies force to the knockout cup when the rocker arm reaches the notch.

18. The forming machine of claim 16, wherein the rocker arm comprises a pivot point about which the rocker arm pivots to move the knockout cup between the raised and the knockout positions.

19. The forming machine of claim 16, wherein the rocker arm comprises a pivot point about which the rocker arm pivots to move the knockout cup between the raised and the knockout positions, and comprising a cam having a notch, the rocker arm having one end run on the cam such that the rocket arm follows the outside perimeter of the cam as the cam is rotated, and wherein the rocker arm pivots and the linear actuator applies force to the knockout cup when the rocker arm reaches the notch.

20. The forming machine of claim 10, wherein the rocker arm comprises a pivot point about which the rocker arm pivots to move the knockout cup between the raised and the knockout positions, and comprising a cam having a notch, the rocker arm having one end run on the cam such that the rocker arm follows the outside perimeter of the cam as the cam is rotated, and wherein the rocker arm pivots and the linear actuator applies force to the knockout cup when the rocker arm reaches the notch.

21. The knockout mechanism of claim 1, wherein the rocker arm comprises a pivot point about which the rocker arm pivots to move the knockout cup between the raised and the knockout positions, and comprising a cam having a notch, the rocker arm having one end run on the cam such that the rocker arm follows the outside perimeter of the cam as the cam is rotated, and wherein the rocker arm pivots and the linear actuator applies force to the knockout cup when the rocker arm reaches the notch.

22. The knockout mechanism of claim 9, comprising a cam having a notch, the rocker arm operatively connected to the cam such that the rocker arm follows the outside perimeter of the cam as the cam is rotated, and wherein the linear actuator applies force to the knockout cup when the rocker arm reaches the notch.

23. The knockout mechanism of claim 9, wherein the rocker arm comprises a pivot point about which the rocker arm pivots to move the knockout cup between the raised and the knockout positions.

24. The knockout mechanism of claim 9, wherein the rocker arm comprises a pivot point about which the rocker arm pivots to move the knockout cup between the raised and the knockout positions, and comprising a cam having a notch, the rocker arm having one end run on the cam such that the rocker arm follows the outside perimeter of the cam as the cam is rotated, and wherein the rocker arm pivots and the linear actuator applies force to the knockout cup when the rocker arm reaches the notch.

* * * * *